ELECTRICAL CIRCUITS EMPLOYING FERROELECTRIC CAPACITORS

Filed Dec. 10, 1956

INVENTORS J. R. ANDERSON
R. M. WOLFE

BY

ATTORNEY

United States Patent Office 2,839,739

Patented June 17, 1958

2,839,739

ELECTRICAL CIRCUITS EMPLOYING FERRO-ELECTRIC CAPACITORS

John R. Anderson, Dayton, Ohio, and Robert M. Wolfe, Colonia, N. J., assignors to Bell Telephone Laboratories, Incorporated, New York, N. Y., a corporation of New York Application December 10, 1956, Serial No. 627,381

21 Claims. (Cl. 340—173)

This invention relates to shift register circuits and, more particularly, to those of the type utilizing ferroelectric capacitors as the storage elements.

Ferroelectric shift registers of the type in which stored information signals are shifted progressively from stage to stage, and in which capacitors including a dielectric material having the characteristic of remanent polarization of electrostatic dipoles are used as the storage elements, may have wide application in systems dealing with binary information or the binary treatment of information, among which systems are computers, telephone systems, logic circuitry and the like.

The remanent polarization existing in ferroelectric capacitors constitutes the means whereby the storage of binary information is rendered possible. This characteristic is found in certain crystalline structures, such as barium titanate or guanidinium aluminum sulphate hexahydrate, which exhibit a substantially rectangular hysteresis loop curve as the plot of charge corresponding to applied voltage, or charge displacement vs. electric field. Normal ferroelectric crystals, initially uniformly polarized by the application of an external voltage of a given polarity to the terminals of the capacitor of which the crystal is the dielectric, store an equivalent charge in the alignment of the electric dipoles within the dielectric. This dipole alignment remains when the applied voltage is removed, providing the remanent polarization and accounting for the hysteresis loop plot. If a voltage of opposite polarity is applied and then removed, the dipole alignment is established in the opposite direction and a value of charge remains which is negative to the previous value of charge. During the reversal of polarization a comparatively large change of charge in the capacitor occurs. If, however, a voltage is applied which is opposite in polarity to that which would switch the electric dipoles, very little charge is stored and the effective capacitance of the unit is comparatively small. A normal ferroelectric capacitor can be an effective storage element for binary information since it possesses two stable states of remanent dielectric polarization and the existing state can be determined by applying a read-out pulse, among other methods.

Normal ferroelectric capacitors, described above, have the hysteresis loop arranged substantially symmetrically about the point of zero applied voltage. Thus, when a voltage source is removed from such a capacitor the device maintains the state of polarization to which it was last switched.

By contrast certain ferroelectric crystals, such as guanidinium aluminum sulphate hexahydrate, for example, have the property of an internal bias exhibited by a shift of the hysteresis loop along the voltage axis. This property has been described in an article entitled "Properties of Guanidinium Aluminum Sulphate Hexahydrate and Some of Its Isomorphs," by A. N. Holden, W. J. Merz, J. P. Remeika, and B. T. Matthias, appearing in the Physical Review, vol. 101, second series, No. 3 at page 962. In such crystals only one stable state of polarization exists for the case of no applied voltage; although if a proper polarity voltage of amplitude sufficient to overcome the effective internal bias in addition to the normal switching voltage is applied, the electric dipoles switch to a second state which is stable only as long as the applied voltage remains. When it is removed, the dipoles switch spontaneously from the conditionally stable state to that state corresponding to zero applied voltage. Like normal ferroelectric capacitors, internally biased ferroelectrics exhibit a comparatively large change of charge, and, therefore, low impedance, during dipole switching, while the change of charge is small and the impedance high when switching is not taking place.

A ferroelectric shift register using normal ferroelectric capacitors as the storage elements is completely disclosed in application Serial No. 513,710, filed June 7, 1955, of J. R. Anderson. The suitability of such a circuit to the rapid and compact storage of information is readily apparent.

The necessity, until the present, of including elements other than ferroelectric capacitors in such a shift register circuit has presented a handicap in attempting to utilize to full advantage the minimum size inherent in ferroelectric capacitors. The fabrication of many capacitors on a single wafer of ferroelectric crystal produces many storage elements in a very small space. It is the intrastage and interstage elements, such as the double anode silicon diodes of prior ferroelectric shift registers, that account for the major portion of the minimum space requirements, as well as for extra cost and time required in circuit assembly. Furthermore, because of the difference in operating voltage characteristics of such elements from those of ferroelectric capacitors, additional restrictions are placed on the permissible drive voltages for the satisfactory operation of such a circuit.

It is a general object of this invention to provide an improved ferroelectric shift register circuit.

More particularly, an object of this invention is the reduction in permissible minimum size of shift register circuits.

A further object of this invention is the simplification of fabrication techniques available in the manufacture of such circuits.

Another object of this invention is a reduction in the complexity of the voltages needed to operate such a shift register unit.

In an embodiment of this invention, two normal ferroelectric capacitors, a biased ferroelectric capacitor and a resistor are connected in series to form one stage of a shift register. A plurality of such stages may be connected to form the register, the interconnecting means comprising a biased ferroelectric capacitor situated between the output of one stage and the input of the next succeeding stage. The normal ferroelectric capacitors are initially polarized in the opposite polarity from each other to reflect the storage of a binary "0" in the stage. With the capacitors so set no switching can take place from the application of any driving pulses across the stage.

An information pulse representing a binary "1" is applied at an intermediate point in the stage adjacent to the first of the two normal ferroelectric capacitors. Polarities are so arranged that this reverses the direction of polarization of that capacitor. The stage is now set so that both normal ferroelectric capacitors are polarized in the same direction. In this condition, the application of a proper polarity driving pulse switches both these capacitors simultaneously. Furthermore the biased ferroelectric capacitor is connected between the two normal ferroelectric capacitors so that its polarity is the same as that of the two normal ferroelectric capacitors when a "1" is stored in the stage. Thus, it will permit the switching of the normal ferroelectric capacitors upon the application of a driving pulse when a "1" is stored in the stage.

In one embodiment of this invention, out-of-phase driving pulses of a positive polarity are applied to two different driving pulse leads. The first such pulse switches all three capacitors in the stage storing a "1." Thus, the storage of the "1" is actually transferred from the first to the second of the normal ferroelectric capacitors, since the first capacitor has returned to normal direction of remanent polarization. With the removal of the driving pulse, the biased ferroelectric capacitor switches spontaneously returning to its original direction of polarization.

The output of the stage is taken from an intermediate point in the stage adjacent to the second normal ferroelectric capacitor through a biased ferroelectric capacitor to the input terminal of the next stage. The direction of remanent polarization of this biased ferroelectric capacitor is such as to be the same as that of the second normal ferroelectric capacitor storing a "1" in the instant stage and the same as that of the first normal ferroelectric capacitor of the next succeeding stage when it stores a "0." Thus, a series path is provided through three capacitors in such a situation all polarized in the same direction and ready to be switched by a pulse on the second driving pulse lead. These capacitors are the second normal ferroelectric capacitor of the instant stage, the biased ferroelectric capacitor providing the connection of the next stage and the first normal ferroelectric capacitor of the next succeeding stage. Application of the driving pulse switches these three capacitors, returning the second normal ferroelectric capacitor of the instant stage to its normal position for "0" storage and transferring the "1" formerly stored therein to the first normal ferroelectric capacitor of the next stage. Removal of this drive pulse permits the interstage biased ferroelectric capacitor to switch spontaneously to its zero voltage remanent polarization stage. In this manner, a cycle is completed and the position of storage of the bit of information has proceeded to a successive stage, as is conventional in shift register operation.

It has been found advantageous, as a means of making the step of spontaneous switching of the biased ferroelectric more effective, to provide a current path around the biased element for the transfer of stored charge when spontaneous switching occurs. In one embodiment of this invention this is attained by a high resistance connected between the terminals of the biased ferroelectric capacitor.

It will be noted that pulse steering is advantageously accomplished by the biased ferroelectric capacitors used as intrastage and interstage connecting elements. Wherever two such capacitors have a common terminal their zero voltage remanent polarizations will be opposite with respect to this terminal. Therefore, a switching path is provided from this terminal through only one of the biased ferroelectric capacitors, which is as required to shift storage of information along from stage to stage of the shift register.

The fact that the biased ferroelectric capacitors have no breakdown or avalanche voltage within the range of operating potentials for such a circuit advantageously removes some of the limitations priorly existing in ferroelectric shift registers known in the art. Driving pulses may be of equal amplitude rather than having to conform to specially selected different potentials for the two sources. Moreover, if desired, operation may be effected by using a single driving pulse source with alternate positive and negative pulses on a single driving pulse lead.

In one embodiment of this invention it is possible to achieve extreme compactness for a shift register circuit by fabricating all capacitors of a single type on the same crystal wafer. Thus, all the normal ferroelectric capacitors could be constructed on one crystal, and all the biased ferroelectric capacitors could be constructed on another crystal. In this manner, only two wafers would be needed for all the storage and directing elements in a shift register comprising a considerable number of stages. Ease of fabrication is improved by taking advantage of the common junction points for pluralities of elements of the same type.

It is a feature of this invention that an electrical circuit include a pair of ferroelectric capacitors in series and a biased ferroelectric capacitor interposed between the two capacitors.

It is a further feature of this invention that pulses be applied across the pair of capacitors and the biased capacitor, in series, to reverse the state of polarization of the three capacitors.

It is another feature of this invention to employ biased ferroelectric capacitors as intrastage pulse steering elements in ferroelectric shift registers.

It is a still further feature of this invention to employ biased ferroelectric capacitors as interstage pulse directing elements in ferroelectric shift registers.

A complete understanding of this invention and of these and various other features thereof may be gained from the following detailed description and the accompanying drawing, in which:

Fig. 1 is a circuit schematic representation of a ferroelectric shift register using double anode silicon diodes as the intrastage elements and conventional diodes as the interstage elements, as disclosed in application Serial No. 513,710 filed June 7, 1955, of J. R. Anderson;

Figure 1:
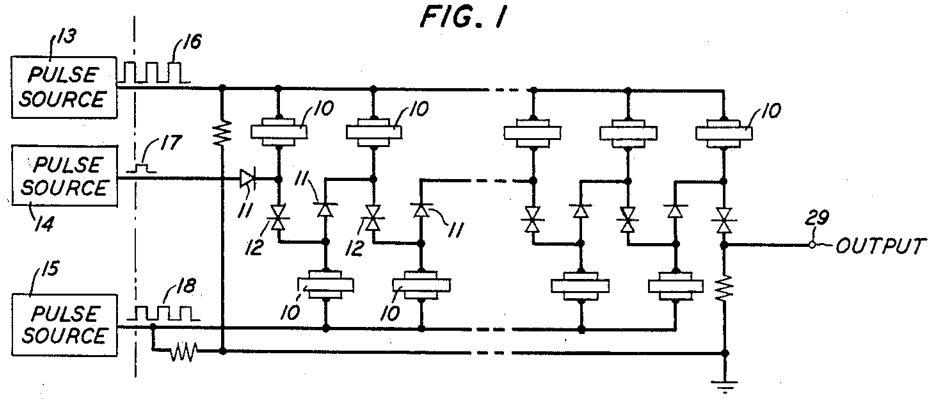

Turning to Fig. 1, this shows a ferroelectric shift register of the type disclosed in application Serial No. 513,710, filed June 7, 1955, of J. R. Anderson. A pair of normal ferroelectric capacitors 10 are arranged in series connection with a double anode diode 12 situated between them. This constitutes one stage of the shift register. An input terminal of this stage is located at the common point between the double anode diode 12 and the upper capacitor 10. Positive information pulses 17 from a pulse source 14 are applied to this terminal of the first stage through a conventional diode 11. An output terminal for this stage is located at the common junction between the double anode diode 12 and the lower capacitor 10. Connection is made between the output terminal of one stage and the input terminal of the next succeeding stage by a conventional diode 11. Two pulse sources 13 and 15 furnish positive drive pulses 16 and 18 respectively on two separate drive pulse leads. Pulses 17 and 18 advantageously occur simultaneously but following in time the application of pulse 16.

A positive pulse 17 represents a binary "1." In preparing the circuit for operation the upper and lower capacitors 10 of each stage are switched to have opposite polarity remanent polarization. With such a condition the application of pulses 16 and 18 has no effect because switching cannot occur when the series capacitors are in opposite polarization states. Pulse 17 applied to the input terminal of the first stage reverses the polarity of the upper capacitor. It is blocked from switching the lower capacitor by double anode diode 12 since its amplitude is below the avalanche voltage of that diode. The capacitors of the first stage are now in condition for switching by the application of a pulse 16 of amplitude equal to or greater than the sum of the double anode diode avalanche voltage and the switching voltages of the two capacitors. Following pulse 17, pulse 16 switches both these capacitors, thereby transferring the "1" storage from the upper to the lower capacitor and returning the upper capacitor to its normal state to await the application of another pulse 17 at the input terminal. Driving pulse 18 following pulse 16 is blocked by the double anode diode but has a switching path through the lower capacitor of one stage and the upper capacitor of the next stage connected by diode 11, both capacitors being of the same polarity. Thus, both capacitors are switched and the binary "1" storage has been shifted from one stage to the next.

Limitations are placed on amplitudes of the various pulses 16, 17 and 18. Pulse 16 must have sufficient amplitude to switch two capacitors and break down the connecting avalanche diode. Pulse 18 must have a lower amplitude to switch two capacitors without breaking down the avalanche diode. Pulse 17 must have a still lower amplitude to switch one capacitor alone.

Figure 2:
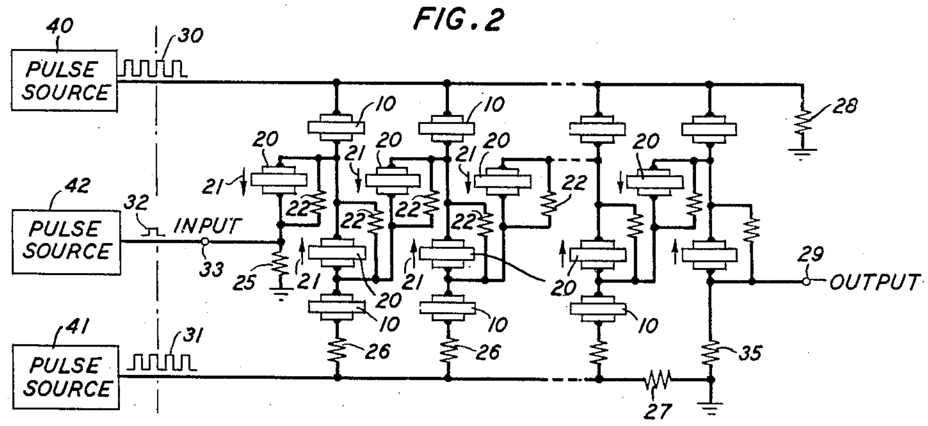
Fig. 2 is a circuit schematic representation of an all ferroelectric shift register using internally biased ferroelectric capacitors to perform all the functions of pulse directing in accordance with one specific illustrative embodiment of this invention.

In Fig. 2 is shown a similar shift register circuit in accordance with the present invention, with internally biased ferroelectric capacitors 20 substituted for the diodes of Fig. 1. The polarity of these biased capacitors is arranged as indicated by the arrows 21 which will be explained later. Operation of the shift register of Fig. 2 is substantially identical with the operation of the shift register in Fig. 1 with the advantageous exception that limitations on the amplitude of drive pulses 31 no longer exist. As before, upper and lower capacitors 10 are normal ferroelectric capacitors and are polarized initially in opposite directions. Therefore, the application of drive pulses has no effect on the circuit. With the application of positive information pulse 32 from pulse source 42 to input terminal 33, the input biased ferroelectric capacitor 20 and the upper capacitor 10 of the first stage are switched thereby storing a "1" in this upper capacitor. Upon removal of pulse 32 capacitor 20 switches spontaneously returning to its stable zero voltage remanent polarization. Following pulse 32, a pulse 30 from pulse source 40 will switch all three capacitors of the first stage, returning upper capacitor 10 to its "0" storage state and transferring the "1" to the lower capacitor 10. At the end of pulse 30, the intrastage capacitor 20 switches spontaneously to its stable state of remanent polarization. Following pulse 30, pulse 31 from pulse source 41 switches the lower capacitor 10 of this stage, interstage capacitor 20 leading to the next stage and upper capacitor 10 of the next stage thus transferring the storage of the binary "1" to the succeeding stage. Termination of pulse 31 permits the interstage capacitor 20 to switch spontaneously and return to its stable state of remanent polarization. Pulses 32 when they occur are in phase with pulses 31. Pulses 30, on the other hand, are out-of-phase therewith. In the manner just described, the state of remanent polarization corresponding to a binary "1" existing in any particular stage of the register is stepped successively down the register until eventually it appears as a positive pulse at the output terminal 29. A resistor 22 connected between the terminals of each biased ferroelectric capacitor 20 furnishes a path for charge transfer when the capacitor 20 switches spontaneously to its state of remanent polarization. Resistors 25, 27 and 28 furnish direct current paths to ground from their respective connecting points. Resistors 26 perform a current limiting function for pulse sources 40 and 41. Resistor 35 is the output resistance of the register across which the output pulses are developed.

Figure 3:
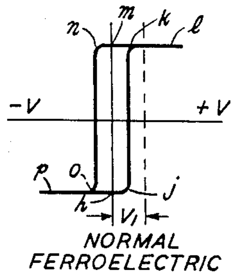
Fig. 3 is a hysteresis loop plot of charge vs. voltage for a normal ferroelectric capacitor.

The hysteresis loop plot of a normal ferroelectric capacitor appearing in Fig. 3 shows the two stable points of remanent polarization *h* and *m*. If we start at *h*, a negative voltage has no effect on the capacitor since the charge moves from *h* to *p* and finally back to *h* upon removal of the negative voltage. If a positive voltage is applied, however, the state of charge travels along the path *hjkl* reversing the polarity of charge on the capacitor. Removal of the positive voltage now leaves the capacitor's remanent polarization at point *m* opposite to its prior state. Additional application of positive voltages now have no effect since they merely cause the capacitor's charge to traverse the path *mkl*. But the application of a negative voltage will switch the capacitor back to its original state along the path *mnop* and finally to *h*.

Figure 4:
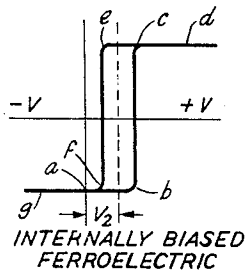
Fig. 4 is a hysteresis loop plot of charge vs. voltage for an internally biased ferroelectric capacitor.

In Fig. 4 which depicts the hysteresis loop of an internally biased ferroelectric capacitor, such as of guanidinium aluminum sulphate hexahydrate, it can be seen that only one state of stable remanent polarization exists for zero applied voltage. This is point *a* in the diagram. From this point, the application of a negative voltage merely takes the capacitor to point *g* and switching is impossible. Positive voltage of amplitude in excess of the sum of the normal switching voltage $V_1$ of Fig. 3 plus the effective internal bias $V_2$ will switch the capacitor by driving the state of charge along path *abcd*. Upon the removal of this voltage, however, the capacitor switches spontaneously along the path *dcefa*. Thus, only one stable state for an internally biased ferroelectric capacitor exists and any other state of polarization is merely conditionally stable.

The arrow 21 of Fig. 2 corresponds to the polarity indicated by the diagram of Fig. 4. That is, the application of a positive voltage to the capacitor terminal corresponding to the point of the arrow with respect to the other terminal, will switch the capacitor from stable state *a* to conditionally stable state *d* with eventual return to *a* when the positive voltage is removed. On the other hand, a negative voltage at the point of the arrow has no effect on the capacitor.

Reference is hereby made to application Serial No. 627,380 of R. M. Wolfe, filed December 10, 1956, describing another ferroelectric shift register circuit incorporating biased ferroelectric capacitors.

It is to be understood that the above described arrangements are illustrative of the application of the principles of the invention. Numerous other arrangements may be devised by those skilled in the art without departing from the spirit and scope of this invention.

What is claimed is:

1. A shift register circuit comprising driving pulse means, pairs of serially connected ferroelectric capacitors, each said capacitor having a dielectric exhibiting a substantially rectangular hysteresis loop, said dielectric having the characteristic of stability in either of two suitably impressed states, biased ferroelectric capacitors, each such capacitor having a dielectric exhibiting a substantially rectangular hysteresis loop, such dielectric having the characteristic of stability in only one of two possible states, certain of said biased capacitors situated as connecting means between both of a pair of said serially connected capacitors, others of said biased capacitors constituting connecting means between adjacent pairs of said serially connected capacitors, information pulse input means, and output means connected to at least one of said capacitors.

2. A shift register circuit in accordance with claim 1 further including impedance means in parallel connection with at least one said biased ferroelectric capacitor.

3. An electrical circuit comprising a pulse source, pairs of serially connected normal ferroelectric capacitors, each having a dielectric exhibiting a substantially rectangular hysteresis loop, said loop being substantially symmetrical about the point of zero applied potential, means connecting said capacitors within a pair, said means including internally biased ferroelectric capacitors, each having a dielectric exhibiting a substantially rectangular hysteresis loop, said loop being substantially symmetrical about some potential other than zero, input means including an information pulse source, and output means connected to at least one of said capacitors.

4. An electrical circuit comprising a driving pulse source, pairs of serially connected normal ferroelectric capacitors, each having a dielectric exhibiting a substantially rectangular hysteresis loop, said loop being substantially symmetrical about the point of zero applied potential, means connecting adjacent pairs of said capacitors, said means including internally biased ferroelectric capacitors each having a dielectric exhibiting a substantially rectangular hysteresis loop, said loop being substantially symmetrical about some potential other than zero, input means comprising an information pulse source, and output means connected to at least one of said capacitors.

5. In a shift register circuit, a plurality of pairs of first ferroelectric capacitors, a second ferroelectric capacitor between said first capacitors of each pair, said second capacitors comprising a dielectric of a ferroelectric material having an internal bias, and means for applying shift pulses across said pairs of first capacitors and said interposed second capacitors.

6. In a shift register circuit in accordance with claim 5, impedance means in parallel connection with at least one said second ferroelectric capacitor.

7. An electrical circuit comprising at least one pair of first ferroelectric capacitors, a second ferroelectric capacitor electrically connected between said first capacitors, said second ferroelectric capacitor having a dielectric of a ferroelectric material having an internal bias, means for applying pulses to said second capacitor, and means for applying pulses across said first and second capacitors.

8. An electrical circuit in accordance with claim 7 further including impedance means in parallel connection with said second ferroelectric capacitor.

9. A shift register circuit comprising a plurality of pairs of first ferroelectric capacitors, a second ferroelectric capacitor electrically connected between each pair of said first capacitors, a second ferroelectric capacitor also connected between one first capacitor of one pair and the other first capacitor of the adjacent pair, said second ferroelectric capacitors including a dielectric of a ferroelectric material having an internal bias, and means for applying pulses across said series connected first and second ferroelectric capacitors.

10. A shift register circuit in accordance with claim 9 further including impedance means connected in parallel with said second ferroelectric capacitors.

11. An electrical circuit comprising pairs of normal ferroelectric capacitors, biased ferroelectric capacitors connected singly in serial connection between units of each pair of said normal ferroelectric capacitors, biased ferroelectric capacitors connected between pairs of said normal ferroelectric capacitors, input means, driving pulse means, and output means.

12. An electrical circuit in accordance with claim 11 further including impedance means in parallel connection with said biased ferroelectric capacitors.

13. An electrical circuit comprising at least one pair of normal ferroelectric capacitors in serial connection, a biased ferroelectric capacitor comprising the connecting means between said normal ferroelectric capacitors, input means, and output means connected to at least one of said normal ferroelectric capacitors.

14. A shift register circuit comprising a plurality of pairs of serially connected normal ferroelectric capacitors and interstage connecting means comprising biased ferroelectric capacitors between pairs of said normal ferroelectric capacitors.

15. A shift register circuit as in claim 14 comprising input means for applying pulses between a pair of serially connected normal ferroelectric capacitors, driving pulse means for applying pulses across said pair of capacitors, and output means.

16. A shift register circuit comprising a plurality of pairs of serially connected normal ferroelectric capacitors and connecting means comprising biased ferroelectric capacitors between each pair of said normal ferroelectric capacitors.

17. A shift register circuit as in claim 16 comprising input means for applying pulses between a pair of serially connected normal ferroelectric capacitors, driving pulse means for applying pulses across said pair of capacitors, and output means.

18. An electrical circuit comprising a pair of normal ferroelectric capacitors, a biased ferroelectric capacitor serially connected between said pair of capacitors, and means for applying pulses across said normal and biased ferroelectric capacitors in series to reverse the state of polarization of said capacitors.

19. An electrical circuit comprising a normal ferroelectric capacitor, a biased ferroelectric capacitor in series with said normal capacitor, means for applying pulses to a point between said capacitors, and means for applying pulses across said capacitors in series.

20. An electrical circuit comprising a normal ferroelectric capacitor, means for applying pulses to said capacitor to determine its state of remanent polarization, a load circuit connected to said capacitor, and means for reversing the state of polarization of said capacitor and transferring an information pulse to said load circuit, said last mentioned means including a biased ferroelectric capacitor in series with said normal ferroelectric capacitor, said biased ferroelectric capacitor spontaneously reestablishing its state of stable remanent polarization.

21. An electrical circuit comprising a first and a second normal ferroelectric capacitor, means for applying a pulse to said first capacitor to determine its state of remanent polarization, and means for reversing the state of polarization of said first capacitor and transferring an information pulse to said second normal ferroelectric capacitor, said last mentioned means including a biased ferroelectric capacitor connected to both said first and second normal capacitors, said biased ferroelectric capacitor spontaneously re-establishing its state of stable remanent polarization.

No references cited.